US012334671B2

(12) United States Patent
Advey

(10) Patent No.: US 12,334,671 B2
(45) Date of Patent: Jun. 17, 2025

(54) RETRACTABLE SEAL SHROUD

(71) Applicant: Yazaki North America, Inc., Canton, MI (US)

(72) Inventor: Alexander Joseph Advey, Ann Arbor, MI (US)

(73) Assignee: Yazaki North America, Inc., Canton, MI (US)

( * ) Notice: Subject to any disclaimer, the term of this patent is extended or adjusted under 35 U.S.C. 154(b) by 377 days.

(21) Appl. No.: 17/969,319

(22) Filed: Oct. 19, 2022

(65) Prior Publication Data

US 2024/0136759 A1 Apr. 25, 2024
US 2024/0235102 A9 Jul. 11, 2024

(51) Int. Cl.
*H01R 13/516* (2006.01)
*H01R 13/52* (2006.01)
*H01R 13/639* (2006.01)

(52) U.S. Cl.
CPC ....... *H01R 13/5213* (2013.01); *H01R 13/516* (2013.01); *H01R 13/5219* (2013.01); *H01R 13/639* (2013.01)

(58) Field of Classification Search
None
See application file for complete search history.

(56) References Cited

U.S. PATENT DOCUMENTS

| | | | |
|---|---|---|---|
| 3,491,326 | A | 1/1970 | Pfister |
| 5,480,312 | A | 1/1996 | Watanabe et al. |
| 6,080,023 | A | 6/2000 | Meulemeester et al. |
| 7,044,762 | B1 | 5/2006 | Hong et al. |
| 7,465,185 | B2 | 12/2008 | Tyler |
| 8,597,043 | B2 | 12/2013 | Zhao |
| 9,337,571 | B2 | 5/2016 | Furuya et al. |
| 9,692,179 | B2 | 6/2017 | Jaworek |
| 9,985,381 | B2 | 5/2018 | Nguyen Nhu et al. |
| 10,581,194 | B2 * | 3/2020 | Baba .................. H01R 13/6272 |
| 11,121,499 | B2 | 9/2021 | Trigg |
| 2013/0095692 | A1 | 4/2013 | Cole |
| 2015/0229080 | A1 | 8/2015 | Degen |

(Continued)

FOREIGN PATENT DOCUMENTS

WO WO-2013/092278 A1 6/2013

OTHER PUBLICATIONS

International Search Report and Written Opinion for International Application No. PCT/US2023/77067, mailed Mar. 25, 2024, 20 pages.

*Primary Examiner* — Tho D Ta
(74) *Attorney, Agent, or Firm* — FOLEY & LARDNER LLP

(57) ABSTRACT

A connector assembly includes a first connector and a second connector. The first connector includes a first locking mechanism. The second connector includes a housing and a seal shroud. The housing includes a seal positioned along an exterior surface of the housing. The seal shroud surrounds the housing and includes a second locking mechanism configured to mate with the first locking mechanism. The seal shroud is movable between a first position and a second position while the first locking mechanism is mated with the second locking mechanism. The seal shroud at least partially covers the seal of the housing in the first position and the seal shroud exposes the seal to an interior facing surface of the first connector in the second position.

19 Claims, 8 Drawing Sheets

(56) References Cited

U.S. PATENT DOCUMENTS

| | | | | |
|---|---|---|---|---|
| 2019/0109407 | A1 | 4/2019 | Wang et al. | |
| 2019/0296485 | A1 | 9/2019 | Masuda et al. | |
| 2022/0302639 | A1 * | 9/2022 | Saito .................. | H01R 13/5219 |

* cited by examiner

RETRACTABLE SEAL SHROUD

BACKGROUND

This application relates generally to wire electrical connector assemblies and, more specifically, to seal shrouds for insulating seals on the connector assemblies.

Automobiles may contain a number of seals provided around an outer surface of electrical components. Such seals may surround (or partially surround) a juncture or connection between two electrical components, thereby protecting or insulating the juncture from external elements (such as rain or water, particulates, and so forth).

SUMMARY

Some seals for electrical components may include seal shrouds. For example, the seals may be protected by a seal shroud provided axially around the seal. The seal shrouds may be formed within a housing of the electrical component, where the seal shrouds may be fixed relative to the seal. As such, the housing and seal shroud may define a larger construction than needed, which can be difficult for packaging or installation into tight spaces of the automobiles.

In one aspect, this disclosure is directed to a connector assembly. The connector assembly includes a first connector and a second connector. The first connector includes a first locking mechanism. The second connector includes a housing and a seal shroud. The housing includes a seal positioned along an exterior surface of the housing. The seal shroud surrounds the housing and includes a second locking mechanism configured to mate with the first locking mechanism. The seal shroud is movable between a first position and a second position while the first locking mechanism is mated with the second locking mechanism. The seal shroud at least partially covers the seal of the housing in the first position and the seal shroud exposes the seal to an interior facing surface of the first connector in the second position.

In some embodiments, the first locking mechanism includes a tab extending along an exterior surface of the first connector. The second locking mechanism includes a protrusion extending along an interior surface of the seal shroud. In some embodiments, the seal shroud covers the seal when the first locking mechanism is unmated from the second locking mechanism. In some embodiments, the housing includes a track having an inclined portion to urge the seal shroud in the second position. A notch is configured to secure the seal shroud in the second position to cover the seal when the second connector is unmated from the first connector.

In some embodiments, the second connector further includes a track provided along at least a portion of the housing. The seal shroud is repositionable along the track between the first position and the second position. In some embodiments, the housing includes a notch extending along an exterior surface of the housing. The housing defines a length extending from an end of the second connector and the notch. The seal shroud is repositionable between the first positon and the second positon along the length of the housing. In some embodiments, the seal is peripherally provided around the second connector. The seal shroud is slidably repositionable along a longitudinal axis between a forward positon and a rearward position. In some embodiments, the housing includes a second seal positioned along an interior facing surface of the housing. The second seal is configured to engage an electrical wire.

In some embodiments, the housing includes a notch extending along an exterior surface of the housing. The notch is configured to abut the seal shroud to axially reposition to cover the seal when the second connector is positioning from the second position to the first position. In some embodiments, the first connector includes a first alignment port and the second connector includes a second alignment port. The first alignment port axially aligned with the second alignment port when the first connector is mated to the second connector. The first and second alignment ports are configured to receive a fastener therethrough.

In another aspect, this disclosure is directed to a connector assembly. The connector assembly includes a second connector configured to mate with a first connector. The first connector includes a first locking mechanism. The second connector includes a housing and a seal shroud. The housing includes a seal positioned along an exterior surface of the housing. The seal shroud surrounds the housing and includes a second locking mechanism configured to mate with the first locking mechanism. The seal shroud is movable between a first position and a second position while the first locking mechanism is mated with the second locking mechanism. The seal shroud at least partially covers the seal of the housing in the first position and the seal shroud exposes the seal to an interior facing surface of the first connector in the second position.

In some embodiments, the seal shroud covers the seal when the first locking mechanism is unmated from the second locking mechanism. In some embodiments, the first locking mechanism includes a tab extending along an exterior surface of the first connector. The second locking mechanism includes a protrusion extending along an interior surface of the seal shroud. In some embodiments, the first connector includes a first alignment port and the second connector includes a second alignment port. The first alignment port axially aligned with the second alignment port when the first connector is mated to the second connector. The first and second alignment ports are configured to receive a fastener therethrough. In some embodiments, the housing includes a notch extending along an exterior surface of the housing. The notch is configured to abut the seal shroud to axially reposition to cover the seal when the second connector is positioning from the second position to the first position.

In some embodiments, the seal is peripherally provided around the second connector. The seal shroud is slidably repositionable along a longitudinal axis between a forward positon and a rearward position. In some embodiments, the housing includes a track having an inclined portion to urge the seal shroud in the second position. A notch is configured to secure the seal shroud in the second position to cover the seal when the second connector is unmated from the first connector. In some embodiments, the second connector further includes a track provided along at least a portion of the housing. The seal shroud is repositionable along the track between the first position and the second position.

In yet another aspect, this disclosure is directed to a connector assembly. The connector assembly includes a first connector and a second connector. The second connector includes a housing and a movable component. The housing includes a seal positioned along an exterior surface of the housing. The movable component is at least partially surrounding the housing. The movable component is positionable between a first position and a second position. The movable component is configured to partially cover the seal when the movable component is in the second position. The first position is a position of the movable component distal the first connector and the second position is a position of the movable component proximate the first connector.

In some embodiments, the first connector includes a first locking mechanism. The movable component is configured to engage the first locking mechanism when the first connector is mated with the second connector to maintain the position of the movable component over the seal.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the FIGURES generally, the various exemplary embodiments disclosed herein relate to a connector assembly. The connector assembly includes a first connector and a second connector. The first connector includes an interface extending from an end of the first connector. The interface includes a protrusion extending outward from the interface. The second connector includes a housing formed about a body of the second connector. The housing may be positioned proximate an exterior of the second connector. A seal may be positioned around an exterior of the housing of the second connector. A seal shroud may be coupled to the second connector on an exterior portion relative to the housing. The seal shroud may be repositionable between a first position and a second position. The first position may be a position in which the seal shroud is positioned distal the first connector. The second position may be a position in which the seal shroud is positioned proximate the second connector. The seal shroud may repositionable along a track. The track may extend along an exterior surface of the housing, where the track extends substantially parallel to an axis defined through a midpoint of the second connector. The seal shroud may include an interface positioned at an end of the seal shroud. When the first connector is mated with the second connector, the interface of the seal shroud may engage the protrusion of the first connector. When the first connector is repositioning from the mated position to an unmated position, the seal shroud may be engaged with the interface of the first connector until the seal shroud is positioned at an end of the track. As such, the seal may always be covered to prevent the seal from becoming damaged.

Figure 1:
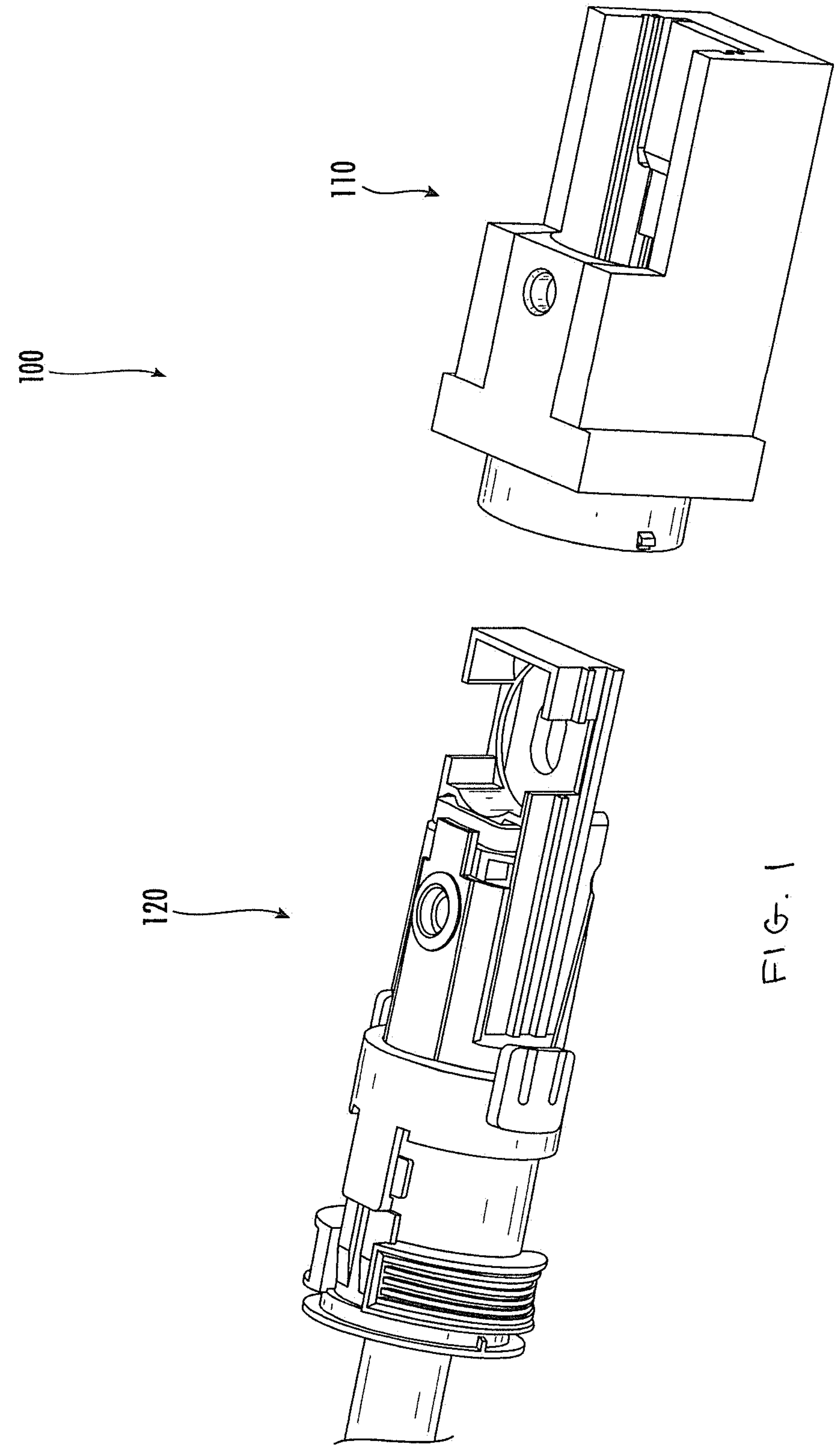
FIG. 1 is an exploded view of a connector assembly according to an exemplary embodiment.
Figure 2:
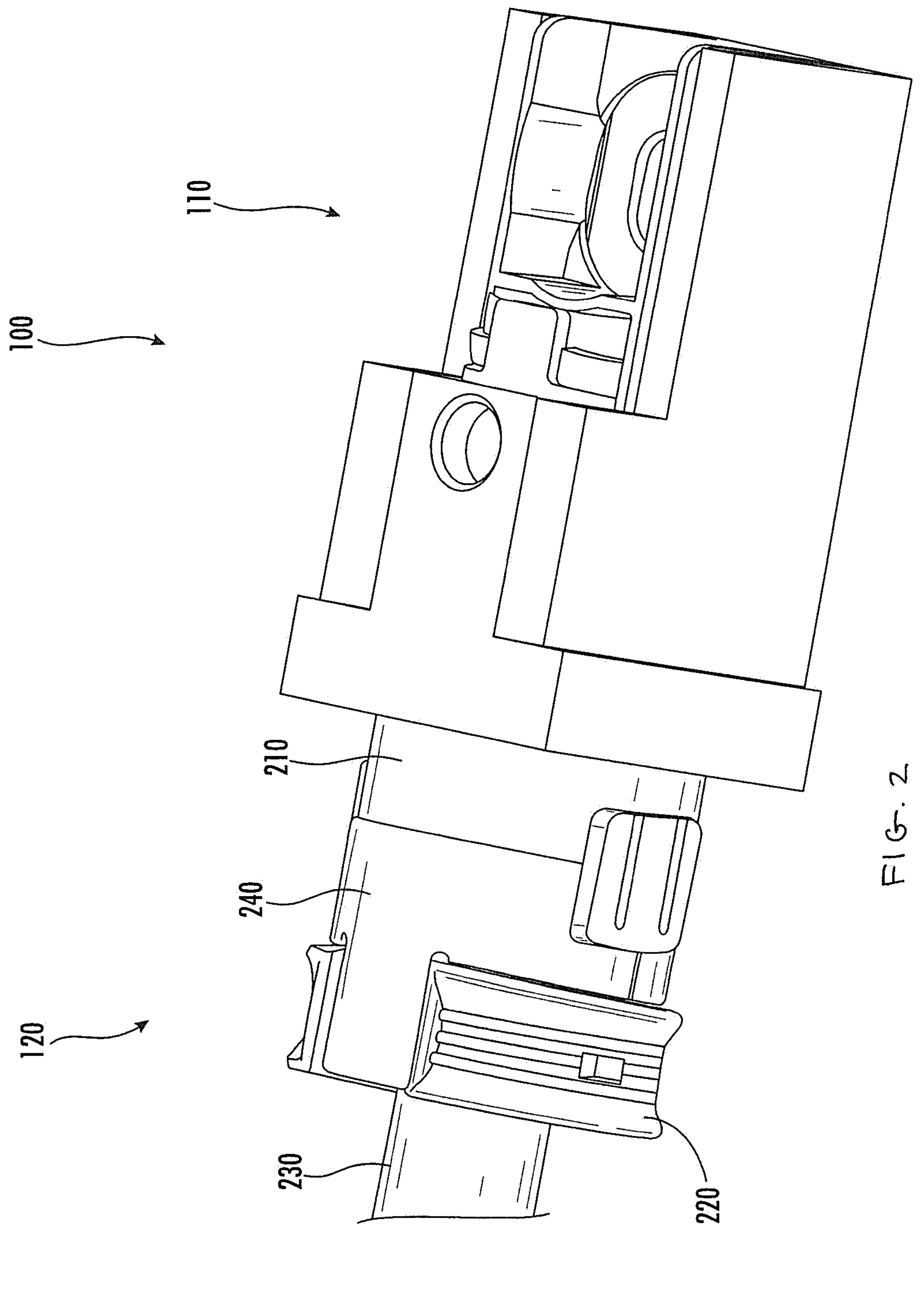
FIG. 2 is a perspective view of the connector assembly of FIG. 1, shown in a mated position, according to an exemplary embodiment.
Figure 3:
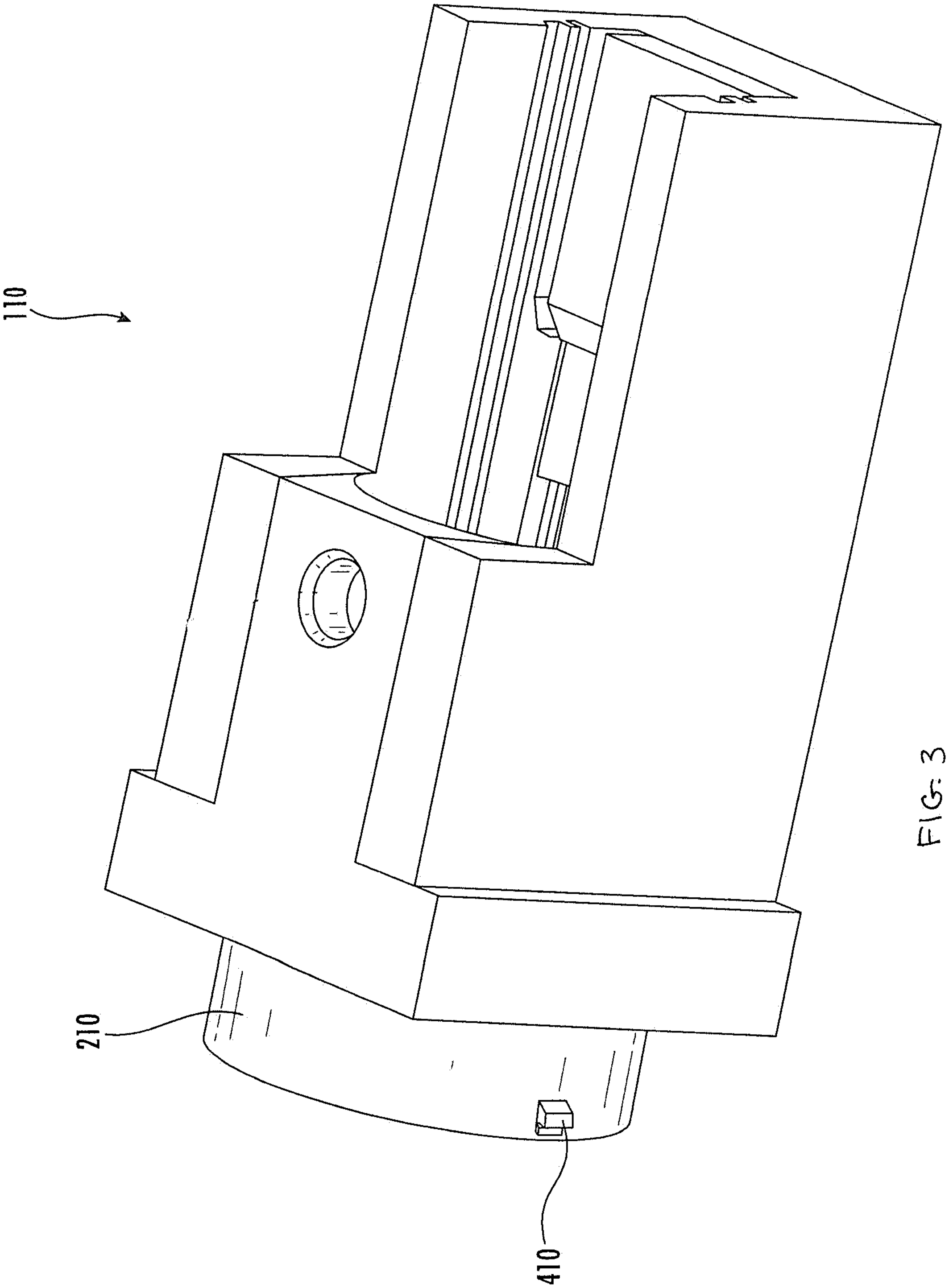
FIG. 3 is a perspective view of a first connector of the connector assembly of FIG. 1, according to an exemplary embodiment.

Referring to FIGS. 1-3, a connector assembly 100 is shown, according to an exemplary embodiment. The connector assembly 100 may be used in a vehicle application, where the connector assembly 100 provides electrical energy therethrough. In some embodiments, the connector assembly 100 may be used for alternate applications and environments (e.g., industrial applications, home applications, or any other application or use case).

The connector assembly 100 may include a first connector 110 and a second connector 120. The first connector 110 may be selectively coupled with the second connector 120. In other embodiments, the first connector 110 may be fixedly coupled with the second connector 120 (e.g., the first connector 110 may be secured to the second connector 120 via a fastener, etc.). The connector assembly 100 may be configurable or movable between an unmated position and a mated position. As shown in FIG. 1, the connector assembly 100 is in the unmated position, where the first connector 110 is not coupled to the second connector 120. As shown in FIG. 2, the connector assembly 100 is in the mated position, where the first connector 110 is coupled to the second connector 120. When the connector assembly 100 is in the mated position, and as described in greater detail below, electrical energy may flow through the connector assembly 100. Accordingly, when the connector assembly 100 is in the unmated positon, electrical energy may not flow through the connector assembly. As will be discussed in greater detail herein, to mate the first connector 110 with the second connector 120, the second connector 120 may be inserted into the first connector 110 along an axis. In other embodiments, the second connector 120 may be rotatable about an axis upon engaging the second connector 120 into the first connector 110 to secure or lock the connector assembly 100.

The first connector 110 may be defined as a female connector, and the second connector 120 may be defined as a male connector. The female connector may include an aperture in which the male connector may be engaged within. Upon engagement of the male connector within the aperture, electrical energy may flow through the connector assembly. In some embodiments, the first connector 110 may be defined as a male connector, and the second connector 120 may be defined as a female connector. In still some embodiments, both the first and second connectors 110, 120 may be male connectors that are received in a sleeve or coupling. In still some embodiments, both the first and second connectors 110, 120 may be female connectors that receive a protrusion or corresponding male portion from an additional component.

Referring specifically to FIG. 2, the first connector 110 may include a device interface 210. The device interface 210 may be an external interface provided at an end of the first connector 110, proximate the second connector 120. The device interface 210 may include a sidewall extending substantially outward from an end of the first connector 110. The sidewall may define the aperture in which the second connector 120 may be received therein. In other embodiments, the device interface 210 may not include the sidewall, where instead the aperture is recessed into a body of the first connector 110.

Figure 4:
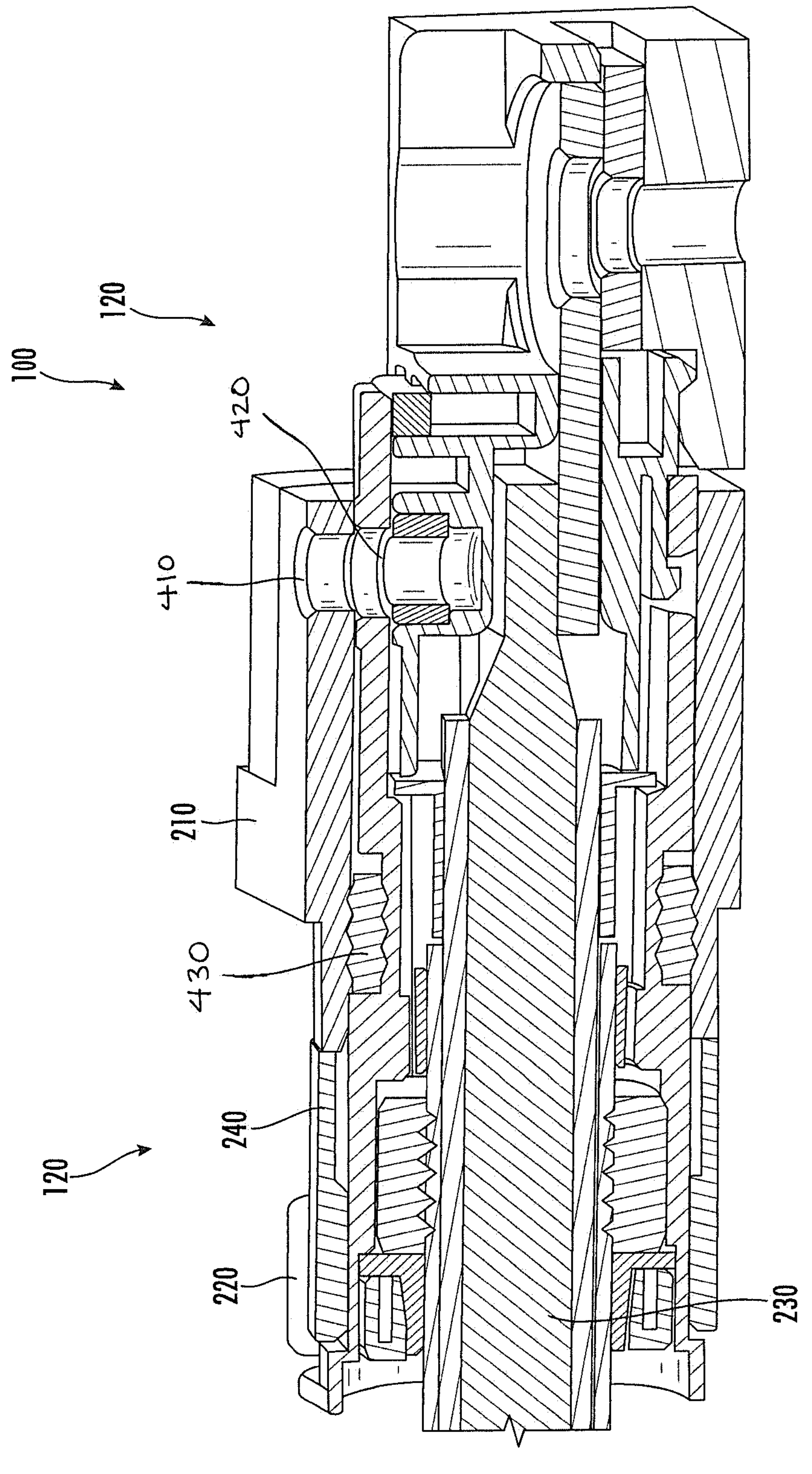
FIG. 4 is a cross-section view of the connector assembly of FIG. 2, according to an exemplary embodiment.

Referring specifically to FIG. 2-FIG. 4, the second connector 120 may include a housing 220. The housing 220 may be defined by an exterior surface of the second connector 120. The housing 220 may define a body of the second connector 120. The housing 220 may extend along at least a portion of a length of the second connector 120. In some embodiments, the housing 220 extends along an entire length of the second connector 120. The housing 220 may include an internal passageway. The internal passageway may extend at least partially through the housing 220. By way of example, the internal passageway may extend through an entire length of the housing 220. The internal passageway may define a passage for which an electrical wire 230 may be provided therethrough. The electrical wire 230 may be one or more wire components that extend through the second connector 120 and deliver the flow of electrical energy through the connector assembly 100.

The second connector 120 may further include a seal shroud 240. The seal shroud 240 may be coupled to the housing 220. In other embodiments, the seal shroud 240 may be coupled to another component of the second connector 120 (e.g. electrical wire 230, etc.). As will be described in greater detail herein, the seal shroud 240 may be slidably repositionable along the housing 220 between a first position and a second position. The first position may be a position where the seal shroud 240 abuts the device interface 210. The second position may be a position where the seal shroud 240 is not positioned against the device interface 210. By way of example, the second position may be any position of the seal shroud 240 where the seal shroud 240 is not positioned against the device interface 210.

Referring now to FIG. 3-FIG. 4, the first connector 110 may include a first locking mechanism, shown as protrusion 310. The protrusion 310 may be a tab, bump, extruded portion, ridge, etc. The protrusion 310 may be positioned on an outer wall of the device interface 210. In other embodiments, the protrusion 310 may be positioned on an inner wall of the device interface 210. In still other embodiments, the protrusion 310 may be positioned on both the outer and inner walls of the device interface 210. By way of example, the first connector 110 may include two protrusions 310. The two protrusions 310 may be positioned on opposite sides of the device interface 210. In another example, the two protrusions 310 may be positioned on adjacent sides of the device interface 210. As can be appreciated, the first connector 110 may include any number of protrusions 310 that would be sufficient for receiving the seal shroud 240 (e.g., one, two, three, four, five, six, etc.). As will be described in greater detail herein, the protrusion(s) 310 may be configured to engage and/or receive one or more portions of the seal shroud 240.

Referring specifically to FIG. 4, the first connector 110 and the second connector 120 may include respective apertures, shown as first aperture 410 and second aperture 420. The first aperture 410 may be positioned on, and extend through, a top of the device interface 210. Accordingly, the second aperture 420 may be positioned on, and extend at least partially through, a top of the housing 220. The first aperture 410 may define a substantially similar diameter as the second aperture 420. In some embodiments, the first aperture 410 may define a substantially different diameter as the second aperture 420 (e.g., the diameter of the first aperture 410 may be greater than the diameter of the second aperture 420, etc.). As can be appreciated, when the second connector 120 is mated with the first connector 110, the first aperture 410 and the second aperture 420 may be coaxially aligned. When the apertures 410, 420 are coaxially aligned, the connector assembly 100 may include a fastener (e.g., bolt, screw, pin, dowel, etc.) that is received within the apertures 410, 420. The fastener may be configured to secure the second connector 120 within the first connector 110, to prevent the second connector 120 from repositioning into the unmated position.

The second connector 120 may include a first seal 430. The first seal 430 may be positioned proximate the exterior surface of the housing 220. In one example, the first seal 430 may be positioned within a slot (e.g., recess, cavity, groove, etc.) formed around the exterior surface of the housing 220. In another example, the first seal 430 may be positioned around the exterior surface of the housing 220 where the first seal 430 extends axially outward from the housing 220. As shown in FIG. 4, the first seal 430 may be engaged against an inner wall of the device interface 210 when the connector assembly 100 is in the mated position. As will be described in greater detail herein, the first seal 430 may be axially covered when the connector assembly 100 is in both the unmated position and the mated position to protect the first seal 430 from debris, particulate, external forces or elements, etc.

Figure 5:
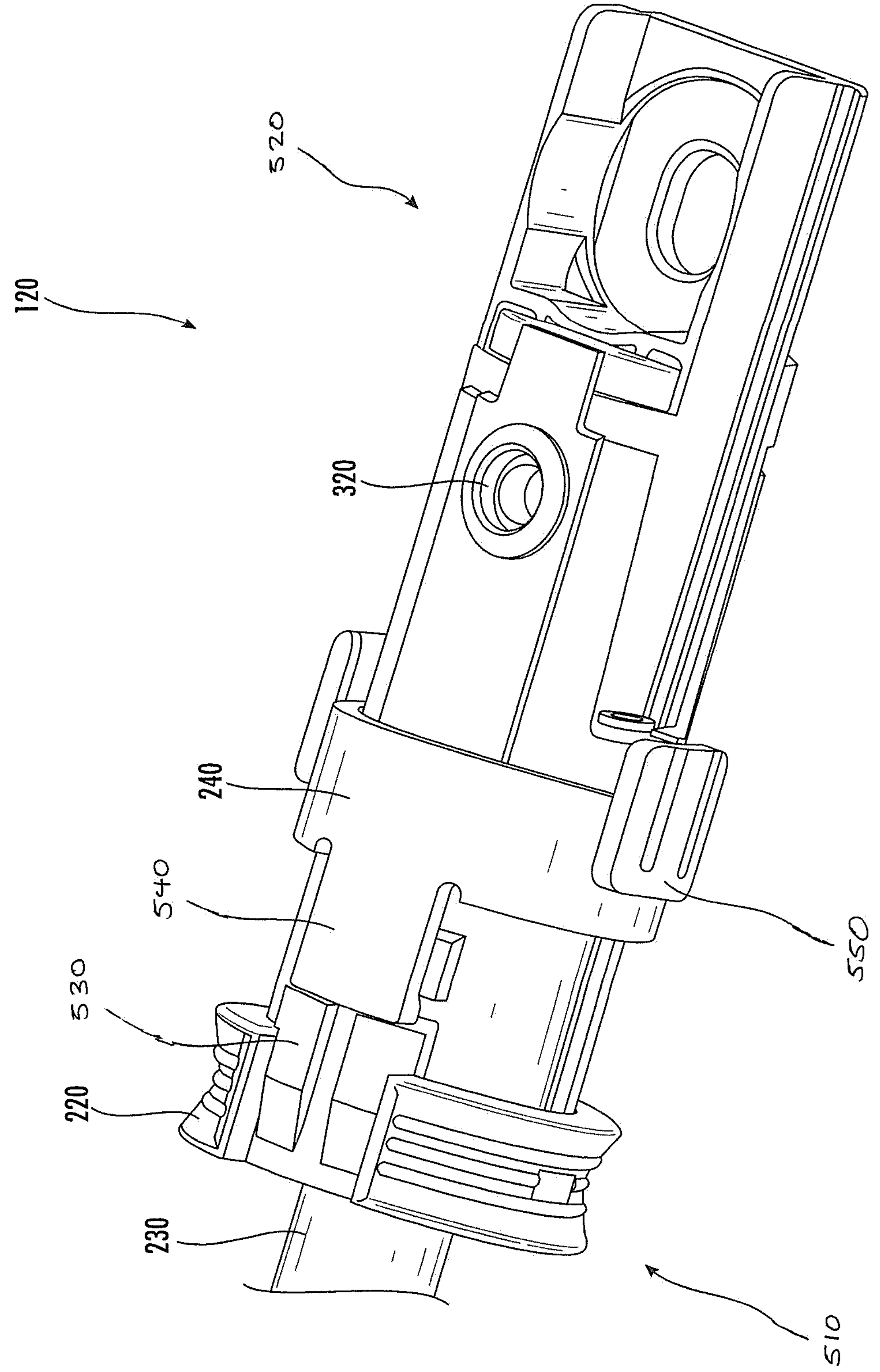
FIG. 5 is a perspective view the second connector of the connector assembly of FIG. 4, according to an exemplary embodiment.

Referring now to FIG. 5, the second connector 120 may include a first end 510 and a second end 520. The first end 510 may be positioned proximate the electrical wire 230 and the second end 520 may be positioned proximate the second aperture 420, opposite the first end 510. The first connector 110 may receive the second connector 120 proximate the second end 520. The second connector 120 may include a track 530. The track 530 may be positioned along a portion of the exterior surface of the housing 220, proximate the first end 510. In other embodiments, the track 530 may be positioned proximate the second end 520. In still other embodiments, the track 530 may extend entirely along the length of the housing 220 between the first end 510 and the second end 520. The seal shroud 240 may be repositionable along the track 530. The seal shroud 240 may be repositionable between the first position and the second position by engaging and disengaging a portion of the seal shroud 240 (e.g., first portion 710 from FIG. 7) with an interface (e.g., interface 810 from FIG. 8) to lock or secure the seal shroud 240 in a particular position.

Figure 6:
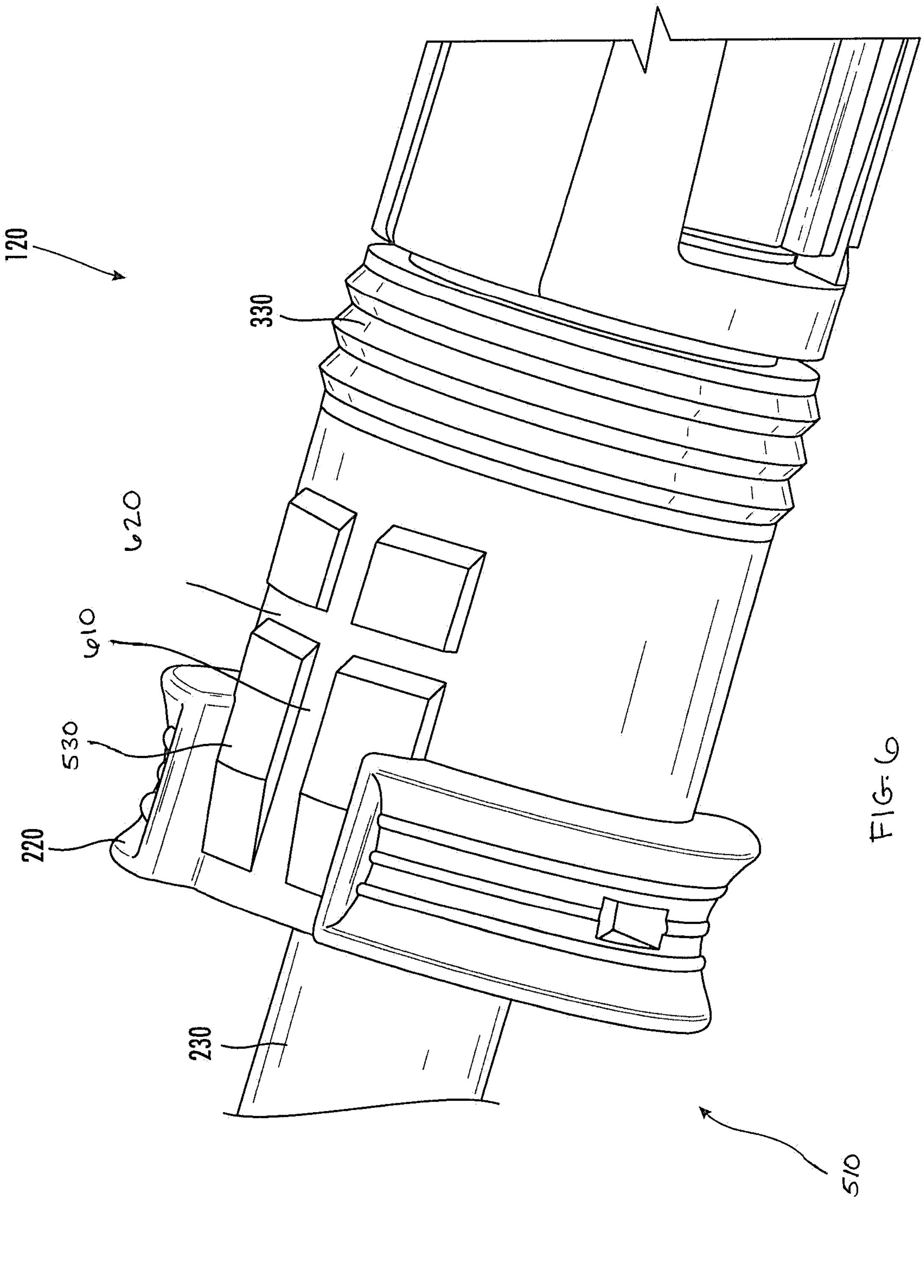
FIG. 6 is a detailed perspective view of the second connector of the connector assembly of FIG. 4, shown without a seal shroud, according to an exemplary embodiment.
Figure 7:
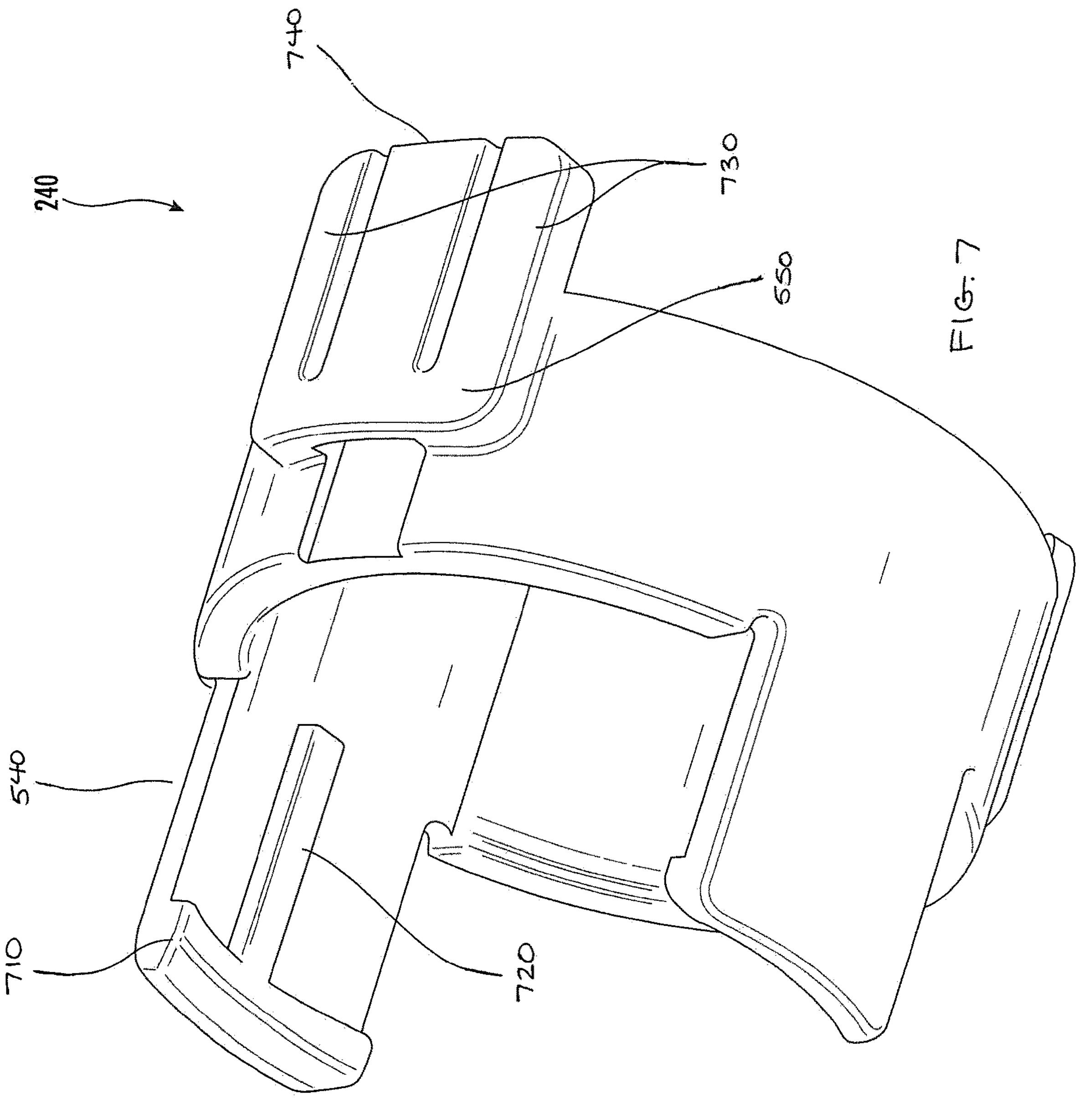
FIG. 7 is a perspective view of a seal shroud of the second connector of the connector assembly of FIG. 4, according to an exemplary embodiment.

Referring now to FIG. 6-FIG. 7, the track 530 may include a second groove 610. The second groove 610 may extend along at least a portion of the length of the track 530. The groove 620 and the second groove 610 may be orthogonal to one another. In other embodiments, the groove 620 and the second groove 610 may be angular or parallel to one another. The second groove 610 may be extend along a midpoint of the track 530 such that the track 530 is separated into two substantially similar track members in which the seal shroud 240 may reposition along.

The interface (e.g., interface 810 from FIG. 8) of the seal shroud 240 may include a first portion 710 and a second portion 720. The first portion 710 may be provided perpendicular to the second portion 720. In other embodiments, the first portion 710 may be provided parallel to the second portion 720. As can be appreciated, when the seal shroud 240 is in the first position, the first portion 710 may not be positioned within the groove 620 and the second portion 720 may be positioned within the second groove. Additionally or alternatively, when the seal shroud 240 is in the second position, the first portion 710 may be positioned within the groove 620 and the second portion 720 may be positioned within the second groove 610. The track 530 may include one or more additional grooves such that the first portion 710 and the second portion 720 may be received within to create additional positions or stops for the seal shroud 240.

Referring to FIG. 7, the second tab 550 of the seal shroud 240 may include one or more outer tabs, shown as outer tab 730, and an inner tab 740. The inner tab 740 may be centrally located between the outer tabs 730. In other embodiments, the second tab 550 may include one outer tab 730 with the inner tab 740 being positioned adjacent the outer tab 730. The inner tab 740 may be spaced apart from the outer tabs 730 by a space, where the inner tab 740 may flex relative to the outer tabs 730. The inner tab 740 may flex outward relative to the outer tabs 730 when the seal shroud 240 is repositioning. More specifically, the inner tab 740 may include a tab, protrusion, tooth, etc. that is configured to engage the protrusion of the first connector 110 (e.g., protrusion 310 of FIG. 3). By way of example, when the first and second connectors 110, 120 are mated, the seal shroud 240 may be engaged against the device interface 210 such that the protrusion of the inner tab 740 is engaged with the protrusion 310 of the device interface 210. As such, the protrusion of the inner tab 740 may be engaged with the protrusion 310 of the device interface 210 when the seal shroud 240 is in the first position. Additionally or alternatively, the protrusion of the inner tab 740 may be engaged with the protrusion 310 of the device interface 210 when the seal shroud 240 is in the second position. Upon unmating the first connector 110 from the second connector 120, the protrusion 310 of the device interface 210 may maintain engagement with the protrusion of the inner tab 740 to reposition the seal shroud 240 from the first position to the second position. When the seal shroud 240 is repositioned into the second position, the first portion 710 of the interface 810 may be received within the groove 620 to disengage the protrusion 310 of the device interface 210 from the protrusion of the inner tab 740. Accordingly, the seal shroud 240 may maintain constant axial arrangement over the first seal 430 to provide a level of protection to the first seal 430.

Figure 8:
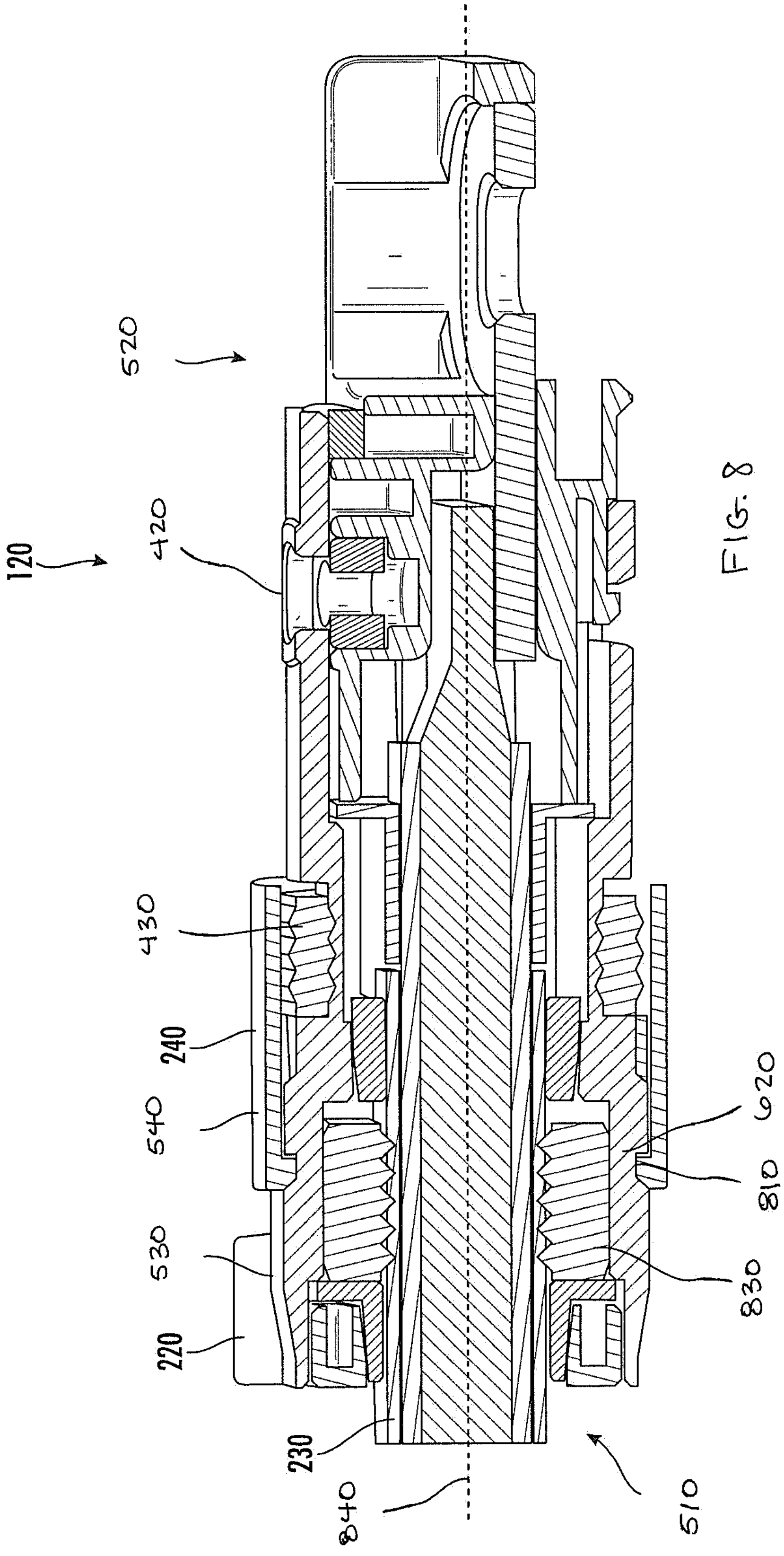
FIG. 8 is a cross-section view of the second connector of the connector assembly of FIG. 4, according to an exemplary embodiment.

As discussed above, the seal shroud 240 may be movable between a first position and a second position. As shown in FIGS. 2 and 4, the first position may be a position where the seal shroud 240 abuts the device interface 210. As shown in FIG. 5, the second position may be a position where the seal shroud 240 is not positioned against the device interface 210. More specifically, the seal shroud 240 may include a first tab 540 positioned axially above the track 530. Referring now to FIGS. 6 and 8, the first tab 540 may be engaged within the track 530 where the seal shroud 240 slides along the track 530. Additionally, when the seal shroud 240 is in the first position, the first tab 540 may be at least partially positioned within a slot defined within an outer portion of the housing 220 where the track 530 is provided therethrough. In some embodiments, the first tab 540 may not be positioned within the slot when the seal shroud 240 is in the first position. In other embodiments, the seal shroud 240 may be positioned over the outer portion of the housing 220 when the seal shroud 240 is in the first position. By way of example, the seal shroud 240 may include two first tabs 540. The two first tabs 540 may be positioned on opposite sides of the seal shroud 240. In other embodiments, the two first tabs 540 may be positioned on adjacent sides of the seal shroud 240. As can be appreciated, each of the two first tabs 540 may be positioned within the respective slot defined within the housing 220 when the seal shroud 240 is in the first position.

The seal shroud 240 may receive a second tab 550 extending outward from a body of the seal shroud 240 along the housing 220. The second tab 550 may be coupled to the seal shroud 240 at an opposite end from the first tab 540. In other embodiments, the second tab 550 may be coupled to the seal shroud 240 adjacent the first tab 540. The second tab 550 may include three elongated members (e.g., tabs, fingers, etc.) extending from the body of the seal shroud 240. As will be discussed in greater detail herein, at least one of the three elongated members may be configured to interface with the protrusion 310. By way of example, the seal shroud 240 may include two second tabs 550. The two second tabs 550 may be positioned on opposite sides of the seal shroud 240. In other embodiments, the two second tabs 550 may be positioned on adjacent sides of the seal shroud 240. As can be appreciated, each of the two second tabs 550 may be configured to interface with the respective protrusion 310 when the connector assembly is in the mated position.

Referring now to FIG. 8, the seal shroud 240 may include a second locking mechanism, shown as interface 810. The interface 810 may be one of a tab, protrusion, tooth, etc. The interface 810 may be positioned proximate an end of the first tab 540 of the seal shroud 240. That is, the interface 810 may be positioned at the end of the first tab 540 of the seal shroud 240 distal the second aperture 420. In other embodiments, the interface 810 may be positioned proximate the second aperture 420 or positioned proximate a central portion of the seal shroud 240. The interface 810 may protrude from an inner surface of the seal shroud 240 to engage a component positioned axially inward the seal shroud 240. In other embodiments, the interface 810 may protrude outward to engage a component positioned axially outward the seal shroud 240. The interface 810 may protrude inward from the seal shroud 240 to engage at least a portion of the track 530. The track 530 may include a groove 620 extending substantially perpendicular to a length of the track 530. The groove 620 may be configured to receive the interface 810 to substantially secure the seal shroud 240 in the second position. The track 530 may include an inclined portion sloped towards the groove 620. The inclined portion may be configured to bias and/or otherwise urge the seal shroud 240 into the second positon via the interface 810. An end of the track 530, opposite the inclined portion, may be substantially protrude outward at an angle relative to the housing 220 (e.g., 60 degrees, 70 degrees, 80 degrees, 90 degrees, 100 degrees, 110 degrees, etc.). The interface 810 may abut the end of the track 530 to prohibit the seal shroud 240 from repositioning past the track 530.

The second connector 120 may further include a second seal 830. The second seal 830 may be positioned inward an outer edge of the housing 220. In other embodiments, the second seal 830 may be positioned proximate the outward edge of the housing 220. The second seal 830 may be configured to engage the electrical wire 230. In other embodiments, the second seal 830 may engage another component of the second connector 120. The second seal 830 may be positioned axially inward to the first seal 430 relative to a connector axis 840 (e.g., longitudinal axis). In other embodiments, the second seal 830 may be positioned axially outward to the first seal 430. In still other embodiments, the second seal 830 may be axially aligned with the first seal 430. The connector axis 840 may extend along a midpoint of the electrical wire 230. In other examples, the connector axis 840 may extend along a midpoint of the second connector 120.

The connector axis 840 may define an axis in which the seal shroud 240 may reposition along. The seal shroud 240 may be repositionable between the first position and the second position along the connector axis 840. As can be appreciated, the first connector 110 and the second connector 120 may be matable along the connector axis 840 to urge movement of the seal shroud 240 between the first and second positions.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms “approximately”, “about”, “substantially”, and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term “exemplary” as used herein to describe various embodiments is intended to indicate that such embodiments are possible examples, representations, and/or illustrations of possible embodiments (and such term is not intended to connote that such embodiments are necessarily extraordinary or superlative examples).

The terms “coupled,” “connected,” and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., “top,” “bottom,” “above,” “below,” “between,” etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the connector assembly as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A connector assembly, comprising:

a first connector including a first locking mechanism; and a second connector comprising:

a housing including a seal positioned along an exterior surface of the housing; and a seal shroud surrounding the housing and including a second locking mechanism configured to mate with the first locking mechanism, the seal shroud movable between a first position and a second position while the first locking mechanism is mated with the second locking mechanism, the seal shroud at least partially covering the seal of the housing in the second position, and the seal shroud exposing the seal to an interior facing surface of the first connector in the first position.

2. The connector assembly of claim 1, wherein the first locking mechanism comprises a tab extending along an exterior surface of the first connector, and wherein the second locking mechanism comprises a protrusion extending along an interior surface of the seal shroud.

3. The connector assembly of claim 1, wherein the seal shroud covers the seal when the first locking mechanism is unmated from the second locking mechanism.

4. The connector assembly of claim 1, wherein the housing comprises a track having an inclined portion to urge the seal shroud in the second position, and wherein a notch is configured to secure the seal shroud in the second position to cover the seal when the second connector is unmated from the first connector.

5. The connector assembly of claim 1, wherein the second connector further comprises a track provided along at least a portion of the housing, the seal shroud repositionable along the track between the first position and the second position.

6. The connector assembly of claim 1, wherein the housing comprises a notch extending along an exterior surface of the housing, and wherein the housing defines a length extending from an end of the second connector and the notch, the seal shroud repositionable between the first position and the second position along the length of the housing.

7. The connector assembly of claim 1, the seal is peripherally provided around the second connector, and wherein the seal shroud is slidably repositionable along a longitudinal axis between a forward position and a rearward position.

8. The connector assembly of claim 1, wherein the housing comprises a second seal positioned along an interior facing surface of the housing, the second seal configured to engage an electrical wire.

9. The connector assembly of claim 1, wherein housing comprises a notch extending along an exterior surface of the housing, the notch configured to abut the seal shroud to axially reposition to cover the seal when the seal shroud is positioning from the first position to the second position.

10. The connector assembly of claim 1, wherein the first connector comprises a first alignment port and the second connector comprises a second alignment port, the first alignment port axially aligned with the second alignment port when the first connector is mated to the second connector, the first and second alignment ports configure to receive a fastener therethrough.

11. A connector assembly, comprising:

a second connector configured to mate with a first connector, the first connector including a first locking mechanism, the second connector comprising:

a housing including a seal positioned along an exterior surface of the housing; and a seal shroud surrounding the housing and including a second locking mechanism configured to mate with the first locking mechanism, the seal shroud movable between a first position and a second position while the first locking mechanism is mated with the second locking mechanism, the seal shroud at least partially covering the seal of the housing in the second position, and the seal shroud exposing the seal to an interior facing surface of the first connector in the first position.

12. The connector assembly of claim 11, wherein the seal shroud covers the seal when the first locking mechanism is unmated from the second locking mechanism.

13. The connector assembly of claim 11, wherein the first locking mechanism comprises a tab extending along an exterior surface of the first connector, and wherein the second locking mechanism comprises a protrusion extending along an interior surface of the seal shroud.

14. The connector assembly of claim 11, wherein the first connector comprises a first alignment port and the second connector assembly a second alignment port, the first alignment port axially aligned with the second alignment port when the first connector is mated to the second connector, the first and second alignment ports configure to receive a fastener therethrough.

15. The connector assembly of claim 11, wherein housing comprises a notch extending along an exterior surface of the housing, the notch configured to abut the seal shroud to axially reposition to cover the seal when the seal shroud is positioning from the first position to the second position.

16. The connector assembly of claim 11, the seal is peripherally provided around the second connector, and wherein the seal shroud is slidably repositionable along a longitudinal axis between a forward position and a rearward position.

17. The connector assembly of claim 11, wherein the housing comprises a track having an inclined portion to urge the seal shroud in the second position, and wherein a notch is configured to secure the seal shroud in the second position to cover the seal when the second connector is unmated from the first connector.

18. The connector assembly of claim 11, wherein the second connector further comprises a track provided along at least a portion of the housing, the seal shroud repositionable along the track between the first position and the second position.

19. A connector assembly, comprising:

a first connector; and a second connector comprising:

a housing including a seal positioned along an exterior surface of the housing; and a movable component at least partially surrounding the housing, the movable component positionable between a first position and a second position and configured to partially cover the seal when the movable component is in the second position;

wherein the first position is a position of the movable component distal the first connector and the second position is a position of the movable component proximate the first connector;

wherein the first connector comprises a first locking mechanism, the movable component configured to engage the first locking mechanism when the first connector is mated with the second connector to maintain the position of the movable component over the seal.

* * * * *